(12) United States Patent
Takahashi

(10) Patent No.: US 7,102,693 B2
(45) Date of Patent: Sep. 5, 2006

(54) DATA ACQUISITION CIRCUIT WHICH CHANGES A RANGE OF A REFERENCE POTENTIAL

(75) Inventor: Sanae Takahashi, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 542 days.

(21) Appl. No.: 10/320,634

(22) Filed: Dec. 17, 2002

(65) Prior Publication Data

US 2003/0184680 A1    Oct. 2, 2003

(30) Foreign Application Priority Data

Mar. 27, 2002    (JP) .............................. 2002-089185

(51) Int. Cl.
*H03M 1/12* (2006.01)
*H04N 5/16* (2006.01)

(52) U.S. Cl. ...................................... 348/573; 348/691

(58) Field of Classification Search ................ 348/572, 348/573, 691; 341/155, 144, 126; H03M 1/12; H04N 5/16
See application file for complete search history.

(56) References Cited

U.S. PATENT DOCUMENTS 4,491,869 A * 1/1985 Heitmann ................... 348/472

FOREIGN PATENT DOCUMENTS

JP    07202696 A * 8/1995

* cited by examiner

*Primary Examiner*—Sherrie Hsia
(74) *Attorney, Agent, or Firm*—Buchanan Ingersoll & Rooney PC

(57) ABSTRACT

An A/D converter updates its reference potential so that it coincides with an analog potential of a video signal. The A/D converter changes a variable voltage range of the reference potential during the same horizontal synchronizing period based upon a horizontal synchronizing signal. It is possible to correctly discriminate data superposed on the video signal even if an analog potential of the video signal considerably varies during the same horizontal synchronizing period.

7 Claims, 9 Drawing Sheets

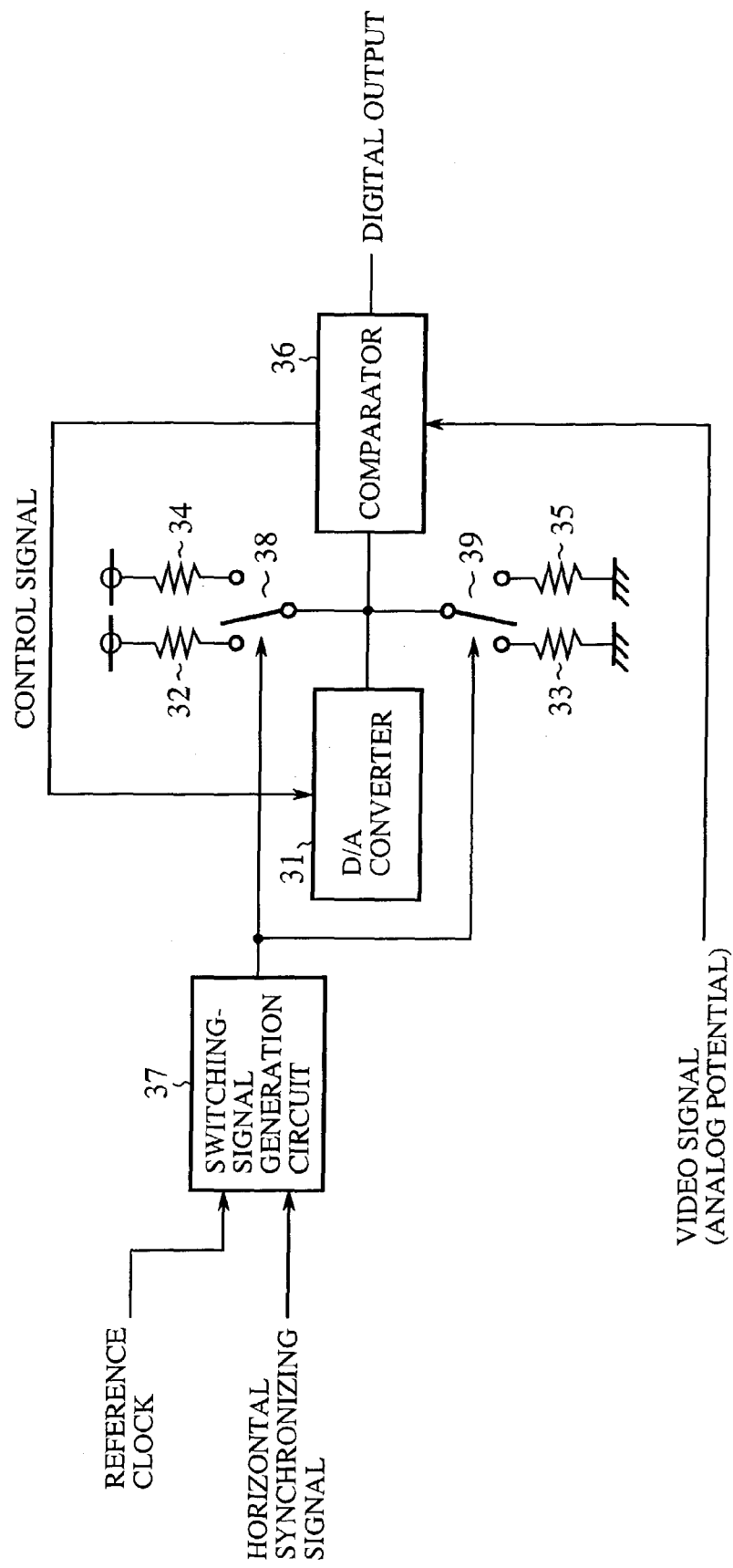

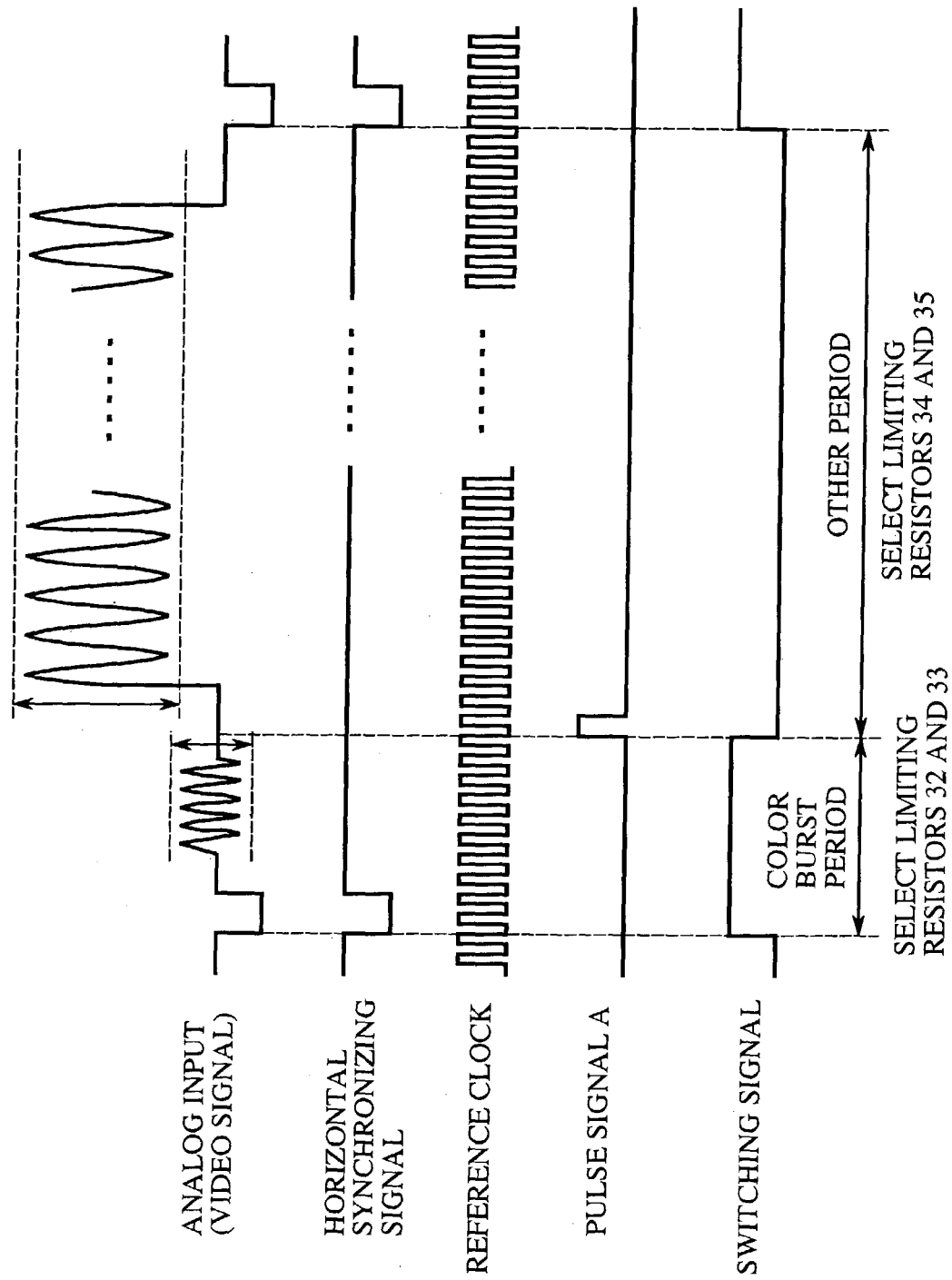

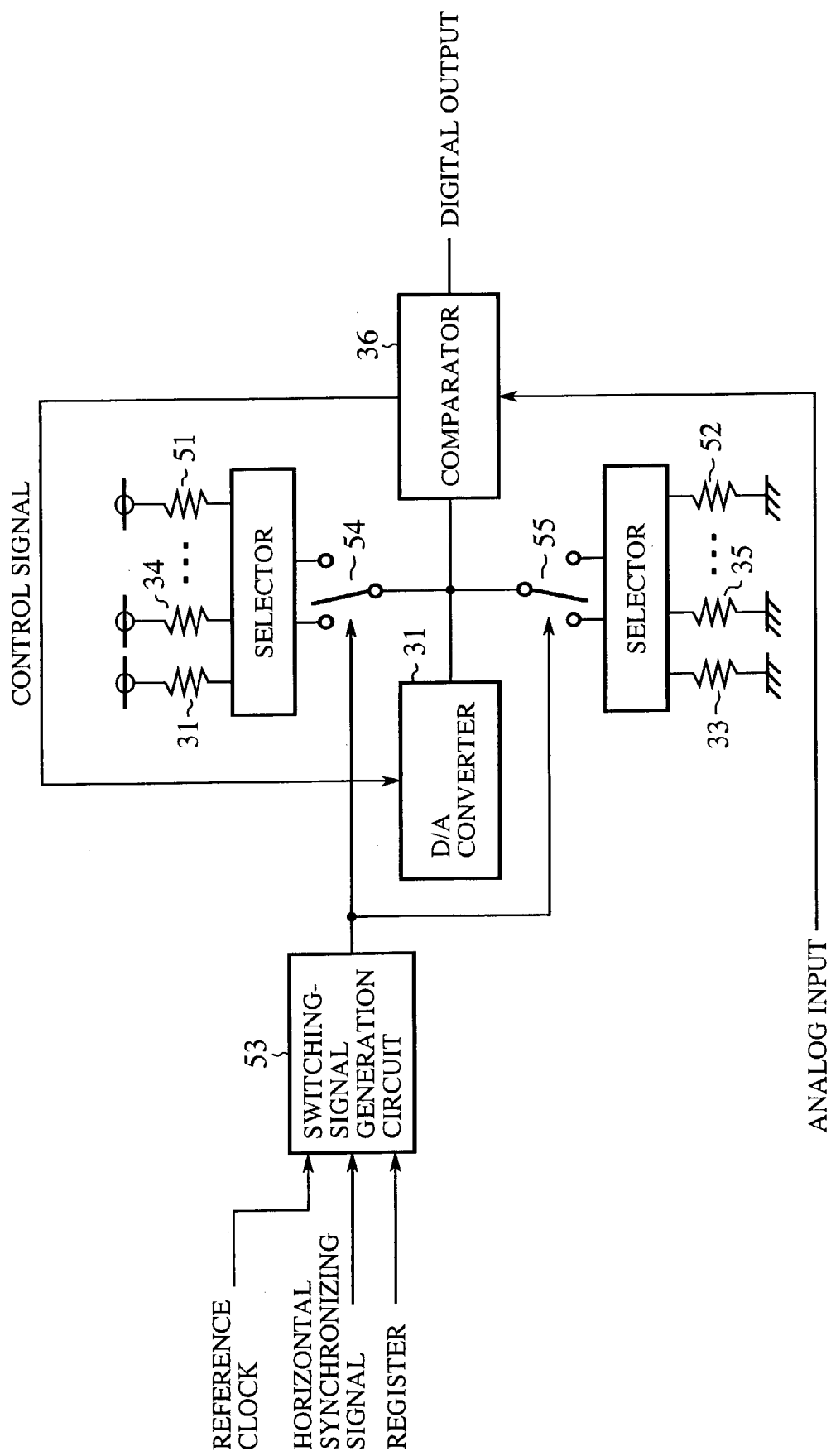

← SWITCHING SIGNAL

VIDEO SIGNAL → A/D CONVERTER (1) → 0/1 JUDGMENT CIRCUIT (2) → MEMORY (3)

CONTROL SIGNAL

D/A CONVERTER (11) — COMPARATOR (14) — DIGITAL VALUE 12, 13

VIDEO SIGNAL (ANALOG POTENTIAL)

DATA ACQUISITION CIRCUIT WHICH CHANGES A RANGE OF A REFERENCE POTENTIAL

BACKGROUND OF THE INVENTION

1. Field of the Invention

The present invention relates to a data acquisition circuit for acquiring data superposed on a video signal.

2. Description of Related Art

FIG. 11 is a block diagram showing a conventional data acquisition circuit.

Referring to FIG. 11, reference numeral 1 denotes an A/D converter for updating its reference potential so that the reference potential coincides with an analog potential of a video signal and outputting a digital value corresponding to the reference potential, reference numeral 2 a 0/1 judgment circuit for comparing the digital value outputted from the A/D converter 1 with a predetermined judgment reference value to convert the digital value into binary code and reference numeral 3 a memory for storing therein the binary-coded digital value ("0" or "1") obtained by the 0/1 judgment circuit 2.

FIG. 12 is a block diagram showing an internal configuration of the A/D converter 1.

Referring to FIG. 12, reference numeral 11 denotes a D/A converter for updating the reference potential in accordance with a compared result obtained by a comparator 14 and outputting the updated reference potential, reference numerals 12 and 13 limiting resistors for limiting the variable voltage range of the reference potential and reference numeral 14 a comparator for comparing the reference potential whose variable voltage range is limited by the limiting resistors 12 and 13 with the analog potential of the video signal and outputting the digital value corresponding to the reference potential when the reference potential coincides with the analog potential.

Next, the operation of the conventional data acquisition circuit will be described.

First, the A/D converter 1 receives a video signal as an analog signal and successively updates its reference potential so that the reference potential coincides with the analog potential of the video signal. When the analog potential of the video signal coincides with the reference potential, the A/D converter 1 outputs a digital value corresponding to the reference potential.

Specifically, when the D/A converter 11 in the A/D converter 1 outputs the reference potential, the comparator 14 in the A/D converter 1 compares the reference potential whose variable voltage range is limited by the limiting resistors 12 and 13 with the analog potential of the video signal.

The comparator 14 outputs a control signal instructing a raising of the reference potential to the D/A converter 11 when the reference potential is lower than the analog potential of the video signal and outputs a control signal instructing a lowering of the reference potential to the D/A converter 11 when the reference potential is higher than the analog potential of the video signal.

Further, the comparator 14 outputs the digital value corresponding to the reference potential when the reference potential coincides with the analog potential of the video signal.

The reason why the limiting resistors 12 and 13 are connected to the output side of the D/A converter 11 is as follows.

In a case of 6-bit A/D converter 1, for example, when the variable voltage of the reference potential outputted from the D/A converter 11 ranges from 0 to 5 V, the resolution per 1 bit is 0.079 V and if the limiting resistors 12 and 13 are connected thereto to limit the variable voltage of the reference potential with the range from 1 to 3 V, the resolution per 1 bit comes to 0.032 V and the resolution per 1 bit increases by a factor of about 2.5.

When the A/D converter 1 outputs the digital value in the manner as described above, the 0/1 judgment circuit 2 compares the digital value with the predetermined judgment reference value.

Then, when the digital value is larger than the predetermined judgment reference value, the 0/1 judgment circuit 2 stores "1" into the memory 3. Otherwise, the 0/1 judgment circuit 2 stores "0" into the memory 3.

The conventional data acquisition circuit thus configured as above improves the resolution per 1 bit, but if a video signal having an analog potential out of the variable voltage range of the reference potential is inputted (for example, a video signal having an analog potential of 4 V is inputted when the variable voltage ranges from 1 to 3 V), the conventional circuit does not properly acquire data superposed on the video signal, or the like.

SUMMARY OF THE INVENTION

The present invention has been made to solve the above problems and it is an object of the present invention to provide a data acquisition circuit capable of correctly discriminating data superposed on a video signal even if an analog potential of the video signal considerably varies during the same horizontal synchronizing period.

The data acquisition circuit according to the present invention includes an A/D converter for updating its reference potential so that the reference potential coincides with an analog potential of a video signal and outputting a digital value corresponding to the reference potential and binary-coding means for comparing the digital value outputted from thee A/D converter with a predetermined judgment reference value to convert the digital value into binary cord, and the A/D converter changes a variable voltage range of the reference potential during the same horizontal synchronizing period.

Therefore, the present invention correctly discriminates data superposed on the video signal even if the analog potential of the video signal considerably varies during the same horizontal synchronizing period. Further, the present invention changes the variable voltage range of the reference potential without making the circuit configuration complicate.

BRIEF DESCRIPTION OF THE DRAWINGS

FIG. 2 is a block diagram showing an internal configuration of an A/D converter;

FIG. 4 is a chart showing a switching timing of limiting resistors;

FIG. 5 is a block diagram showing an internal configuration of an A/D converter in a data acquisition circuit according to a second embodiment of the present invention;

DETAILED DESCRIPTION OF THE PREFERRED EMBODIMENTS

Preferred embodiments of the present invention will be described in detail with reference to the accompanying drawings.

FIRST EMBODIMENT

Figure 1:
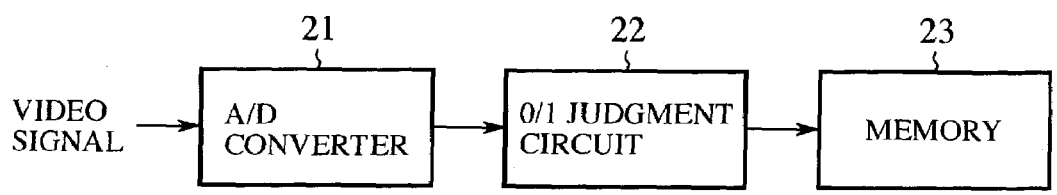
FIG. 1 is a block diagram showing a configuration of a data acquisition circuit according to a first embodiment of the present invention.

FIG. 1 is a block diagram showing a configuration of a data acquisition circuit according to the first embodiment of the present invention.

Referring to FIG. 1, reference numeral 21 denotes an A/D converter for updating its reference potential so that the reference potential coincides with an analog potential of a video signal and outputting a digital value corresponding to the reference potential, reference numeral 22 a 0/1 judgment circuit (binary-coding means) for comparing the digital value outputted from the A/D converter 21 with a predetermined judgment reference value to convert the digital value into binary code and reference numeral 23 a memory for storing therein the binary-coded digital value ("0" or "1") obtained by the 0/1 judgment circuit 22.

FIG. 2 is a block diagram showing an internal configuration of the A/D converter 21.

Referring to FIG. 2, reference numeral 31 denotes a D/A converter for updating the reference potential in accordance with a compared result obtained by a comparator 36 and outputting the updated reference potential, reference numeral 32 a limiting resistor connected between an output terminal of the D/A converter 31 and a power supply, reference numeral 33 a limiting resistor connected between the output terminal of the D/A converter 31 and a ground, reference numeral 34 a limiting resistor having a resistance value different from that of the limiting resistor 32, reference numeral 35 a limiting resistor having a resistance value different from that of the limiting resistor 33 and reference numeral 36 a comparator for comparing the reference potential whose variable voltage range is limited by the limiting resistors 32 and 33 or the limiting resistors 34 and 35 with the analog potential of the video signal and outputting the digital value corresponding to the reference potential when the reference potential coincides with the analog potential.

Reference numeral 37 denotes a switching-signal generation circuit for generating a switching signal for the limiting resistors based on an input timing of a horizontal synchronizing signal, reference numeral 38 a selector for connecting the limiting resistor 32 or the limiting resistor 34 to the output of the D/A converter 31 in accordance with the switching signal generated by the switching-signal generation circuit 37 and reference numeral 39 a selector for connecting the limiting resistor 33 or the limiting resistor 35 to the output of the D/A converter 31 in accordance with the switching signal generated by the switching-signal generation circuit 37.

Here, the switching means includes the switching-signal generation circuit 37 and the selectors 38 and 39.

Figure 3:
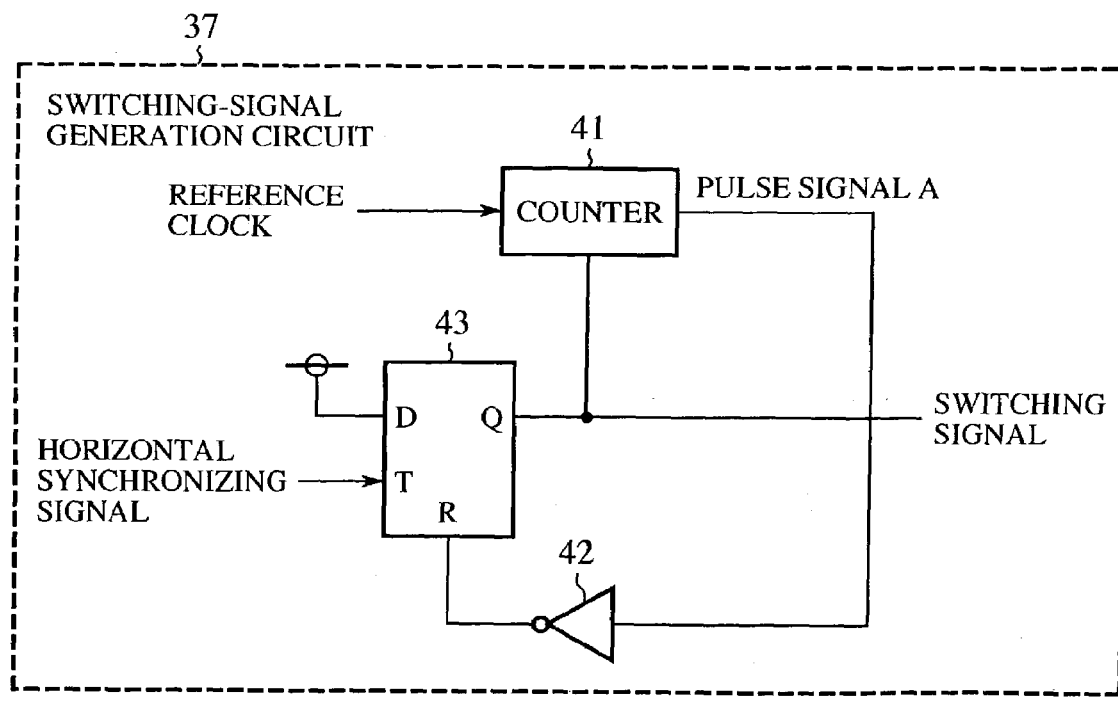
FIG. 3 is a circuit diagram showing an internal configuration of a switching-signal generation circuit.

FIG. 3 is a circuit diagram showing an internal configuration of the switching-signal generation circuit 37.

Referring to FIG. 3, reference numeral 41 denotes a counter which starts counting externally-inputted reference clocks when the horizontal synchronizing signal is externally inputted and outputs a pulse signal A when the count value amounts to a prescribed number, reference numeral 42 an inverter for inverting the output level of the counter 41, reference numeral 43 a flip-flop which outputs a switching signal of H level to the selectors 38 and 39 when the horizontal synchronizing signal is externally inputted while outputting a switching signal of L level to the selectors 38 and 39 when the counter 41 outputs the pulse signal A.

Next, the operation of the data acquisition circuit will be described.

First, the A/D converter 21 receives a video signal as an analog signal and successively updates its reference potential so that the reference potential coincides with the analog potential of the video signal. When the analog potential of the video signal coincides with the reference potential, the A/D converter 21 outputs a digital value corresponding to the reference potential.

Specifically, when the D/A converter 31 in the A/D converter 21 outputs the reference potential, the comparator 36 in the A/D converter 21 compares the reference potential whose variable voltage range is limited by the limiting resistors 32 and 33 with the analog potential of the video signal.

The comparator 36 outputs a control signal instructing a raising of the reference potential to the D/A converter 31 when the reference potential is lower than the analog potential of the video signal and outputs a control signal instructing a lowering of the reference potential to the D/A converter 31 when the reference potential is higher than the analog potential of the video signal.

Further, the comparator 36 outputs a digital value corresponding to the reference potential when the reference potential coincides with the analog potential of the video signal.

Here, the limiting resistors 32 and 33 are connected to the output of the D/A converter 31 as discussed above.

Specifically, during a color burst period as shown in FIG. 4, for example, since the amplitude of the analog potential of the video signal is small, the resolution per 1 bit can be enhanced by narrowing the variable voltage range of the reference potential.

Then, when the horizontal synchronizing signal is externally inputted, the flip-flop 43 of the switching-signal generation circuit 37 in the A/D converter 21 outputs a switching signal of H level to the selectors 38 and 39. Receiving this signal, the selectors 38 and 39 connect the limiting resistors 32 and 33 to the output of the D/A converter 31, respectively, to narrow the variable voltage range of the reference potential.

When a given period of time lapses after the horizontal synchronizing signal is inputted, in other words, when the color burst period is terminated, since the amplitude of the analog potential of the video signal becomes larger, the variable voltage range of the reference potential should be widened to allow potential comparison of the comparator 36.

Then, when the horizontal synchronizing signal is externally inputted, the counter 41 of the switching-signal generation circuit 37 in the A/D converter 21 starts counting the reference clocks which are externally inputted and outputs the pulse signal A when the count value amounts to the prescribed number.

When the counter 41 outputs the pulse signal A, the flip-flop 43 of the switching-signal generation circuit 37 outputs a switching signal of L level to the selectors 38 and 39. Receiving this signal, the selectors 38 and 39 connects the limiting resistors 34 and 35 to the D/A converter 31, respectively, to widen the variable voltage range of the reference potential.

Therefore, when the given period of time lapses after the horizontal synchronizing signal is inputted, the comparator 36 in the A/D converter 21 compares the reference potential limited by the limiting resistors 34 and 35 with the analog potential of the video signal and when the reference potential coincides with the analog potential of the video signal, the comparator 36 outputs the digital value corresponding to the reference potential.

When the A/D converter 21 outputs the digital value as above, the 0/1 judgment circuit 22 compares the digital value with the predetermined judgment reference value.

Then, when the digital value is larger than the predetermined judgment reference value, the 0/1 judgment circuit 22 stores "1" into the memory 23. Otherwise, the 0/1 judgment circuit 22 stores "0" into the memory 23.

As is clear from the above description, according to the first embodiment, the data acquisition circuit has been configured to change the variable voltage range of the reference potential during the same horizontal synchronizing period. Thus, it correctly discriminates data superposed on the video signal even if the analog potential of the video signal considerably varies during the same horizontal synchronizing period.

SECOND EMBODIMENT

FIG. 5 is a block diagram showing an internal configuration of the A/D converter 21 of a data acquisition circuit according to the second embodiment of the present invention. In FIG. 2, like reference numerals as FIG. 2 indicate the same components, and therefore description thereof is omitted for brevity's sake.

Reference numeral 51 denotes a limiting resistor having a resistance value different from those of the limiting resistors 32 and 34, reference numeral 52 a limiting resistor having a resistance value different from those of the limiting resistors 33 and 35, reference numeral 53 a switching-signal generation circuit for generating a switching signal for the limiting resistors based on the input timing of the horizontal synchronizing signal, reference numeral 54 a selector for connecting the limiting resistor 32, 34 or 51 to the output of the D/A converter 31 in accordance with the switching signal generated by the switching-signal generation circuit 53 and reference numeral 55 a selector for connecting the limiting resistor 33, 35 or 52 to the output of the D/A converter 31 in accordance with the switching signal generated by the switching-signal generation circuit 53.

Here, the switching means includes the switching-signal generation circuit 53 and the selectors 54 and 55.

Figure 6:
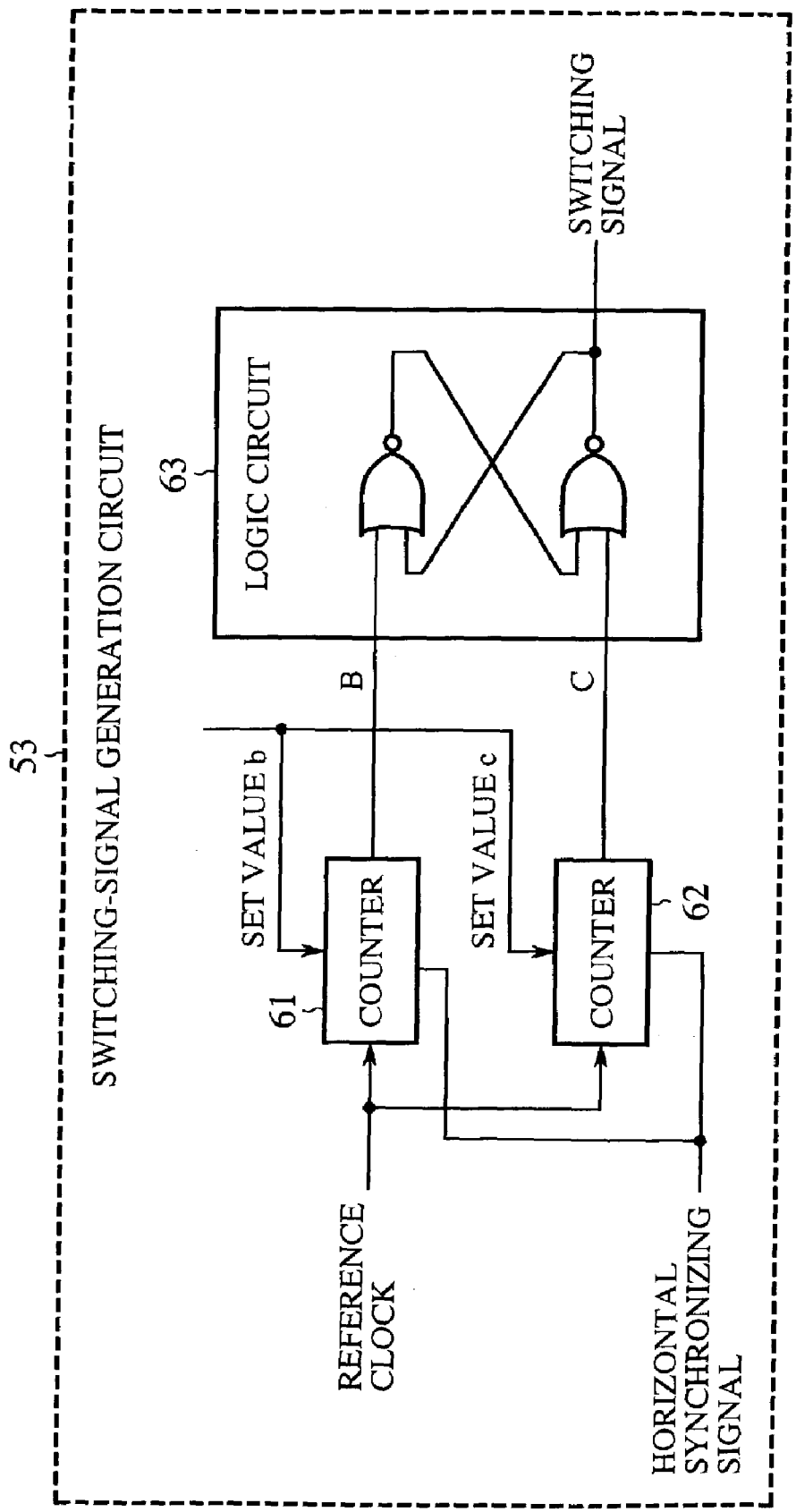
FIG. 6 is a circuit diagram showing an internal configuration of a switching-signal generation circuit.

FIG. 6 is a circuit diagram showing an internal configuration of the switching-signal generation circuit 53.

Referring to FIG. 6, reference numeral 61 denotes a counter which externally receives an input of set value b indicative of a switching timing of the limiting resistors, and starts counting externally-inputted reference clocks when the horizontal synchronizing signal is externally inputted and outputs a pulse signal B when the count value amounts to the set value b, reference numeral 62 a counter which externally receives an input of set value c (b<c) indicative of a switching timing of the limiting resistors, and starts counting externally-inputted reference clocks when the horizontal synchronizing signal is externally inputted and outputs a pulse signal C when the count value amounts to the set value c and reference numeral 63 a logic circuit which outputs a switching signal of H level to the selectors 54 and 55 when the counter 61 outputs the pulse signal B and outputs a switching signal of L level to the selectors 54 and 55 when the counter 62 outputs the pulse signal C.

The circuit configuration in which the limiting resistors connected to the output of the D/A converter 31 are switched when the given period of time lapses after the horizontal synchronizing signal is inputted has been shown in the first embodiment. Alternatively, a circuit configuration in which the setting of switching timing for the limiting resistors is received and the limiting resistors to be connected to the output of the D/A converter 31 are switched at the switching timing after the horizontal synchronizing signal is inputted. Also in such a case, the same effect as with the first embodiment can be obtained Specifically, the counter 61 of the switching-signal generation circuit 53 externally receives the set value b indicative of the switching timing of the limiting resistors in advance and the counter 62 externally receives the set value c indicative of the switching timing of the limiting resistors in advance.

Figure 7:
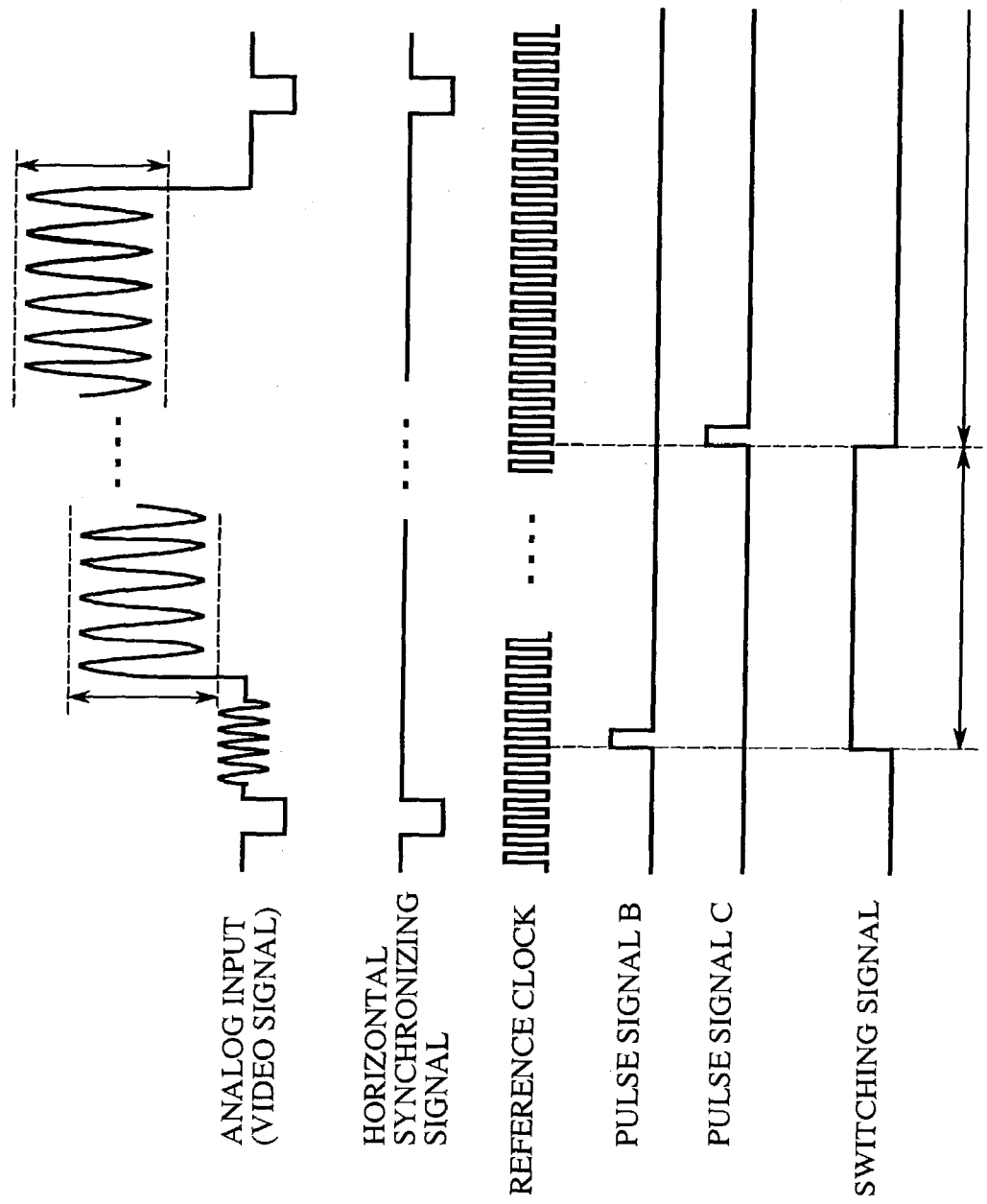
FIG. 7 is a chart showing waveforms of various signals.

Then, the counters 61 and 62 of the switching-signal generation circuit 53 starts counting the reference clocks which are externally inputted when the horizontal synchronizing signal is inputted, as shown in FIG. 7, and the counters 61 and 62 output the pulse signals B and C when the count values amount to the set values b and c, respectively.

In the case of FIG. 7, when the counter 61 outputs the pulse signal B, the logic circuit 63 outputs the switching signal of H level to the selectors 54 and 55. Receiving this signal, the selectors 54 and 55 switch from the limiting resistors 32 and 33 to the limiting resistors 34 and 35 to be connected to the output of the D/A converter 31, respectively.

Further, when the counter 62 outputs the pulse signal C, the logic circuit 63 outputs the switching signal of L level to the selectors 54 and 55. Receiving this signal, the selectors 54 and 55 switch from the limiting resistors 34 and 35 to the limiting resistors 51 and 52 to be connected to the output of the D/A converter 31, respectively.

THIRD EMBODIMENT

Figure 8:
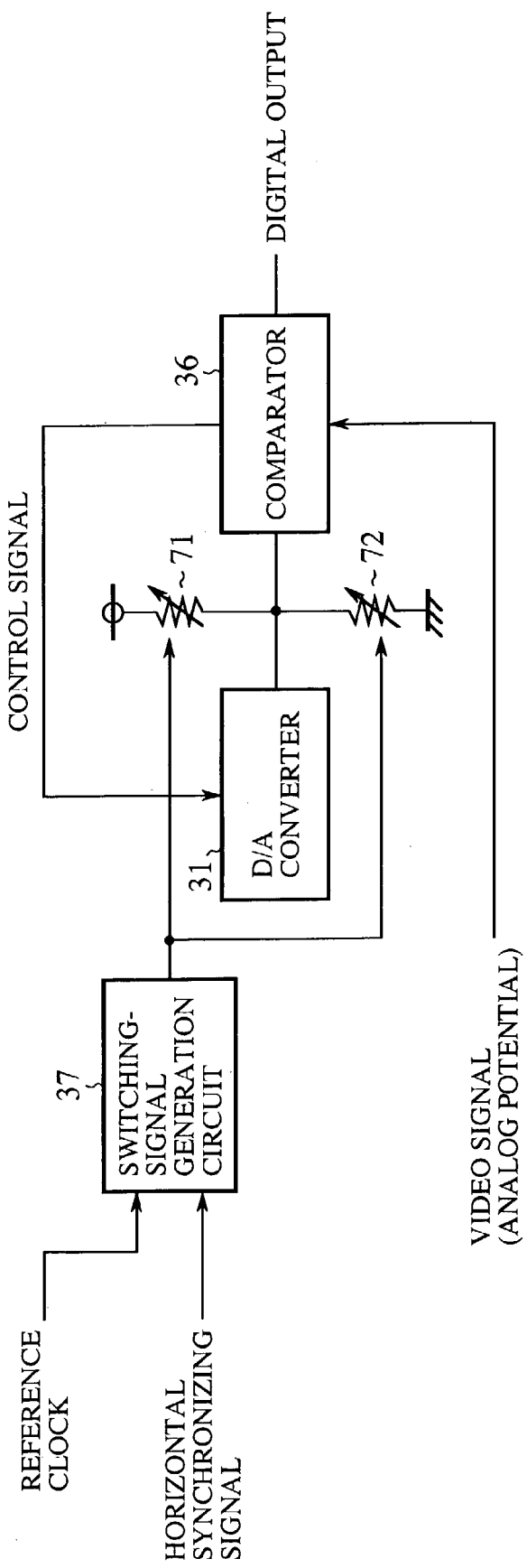
FIGS. 8 and 9 are block diagrams each showing an internal configuration of an A/D converter of a data acquisition circuit according to a third embodiment of the present invention.
Figure 9:
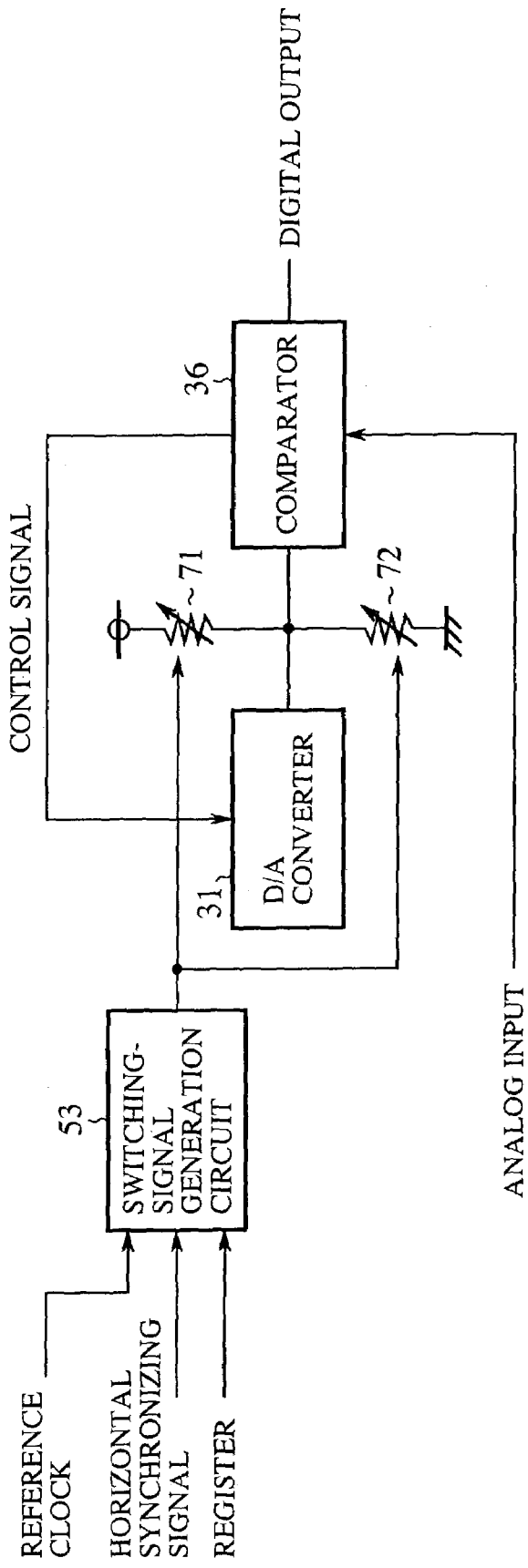
Figure 10:
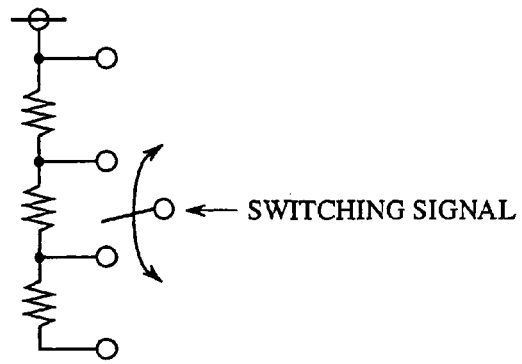
FIG. 10 is a circuit diagram showing an specific example of circuit configuration of a limiting variable resistor.
Figure 11:
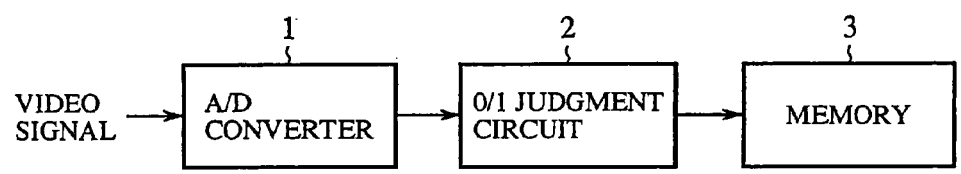
FIG. 11 is a block diagram showing a configuration of a conventional data acquisition circuit.
Figure 12:
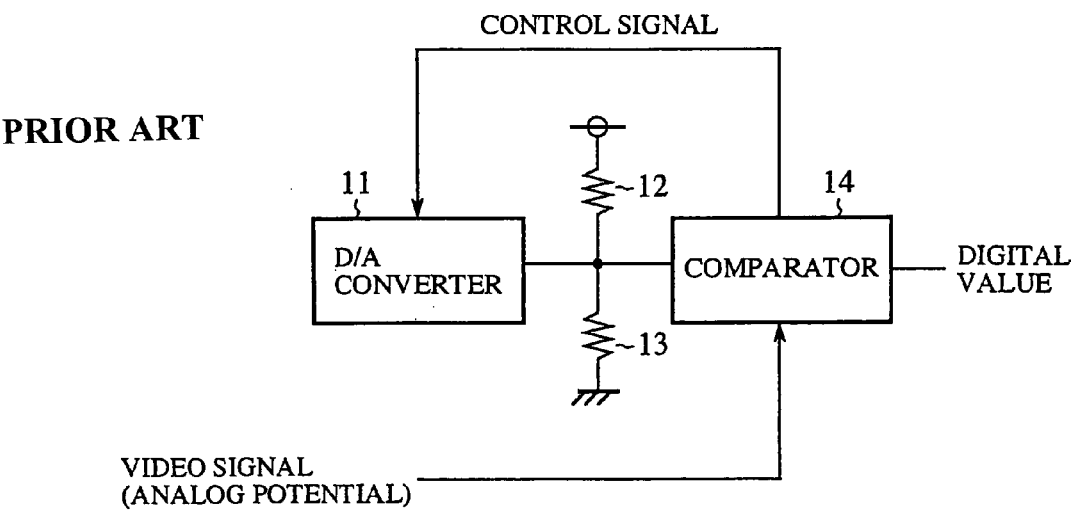
FIG. 12 is a block diagram showing an internal configuration of an A/D converter.

The circuit configuration in which the limiting resistors to be connected to the output of the D/A converter 31 is switched has been shown in the first and second embodiments. Alternatively, a circuit configuration in which limiting variable resistors 71 and 72 are provided, instead of the limiting resistors 32, 34 and the like, as shown in FIGS. 8 and 9, and the switching-signal generation circuits 37 and 53 output the switching signals to the limiting variable resistors 71 and 72 and the limiting variable resistors 71 and 72 change the resistance values in accordance with the switching signals. Also in such a case, the same effect as with the first and second embodiments can be obtained. FIG. 10 is a circuit diagram showing an specific example of circuit configuration of the limiting variable resistors 71 and 72.

What is claimed is:

1. A data acquisition circuit comprising:
    an A/D converter for updating its reference potential so that said reference potential coincides with an analog potential of a video signal and outputting a digital value corresponding to said reference potential; and
    binary-coding means for comparing said digital value outputted from said A/D converter with a predetermined judgment reference value to convert said digital value into binary code,
    wherein said A/D converter changes a variable voltage range of said reference potential during a same horizontal synchronizing period based upon a horizontal synchronizing signal.

2. The data acquisition circuit according to claim 1, wherein, said A/D converter comprises:
    a D/A converter for updating and outputting said reference potential;
    a comparator for comparing said reference potential outputted from said D/A converter with said analog potential of said video signal and outputting a digital value corresponding to said reference potential when said reference potential coincides with said analog potential;
    a plurality of limiting resistors having different resistance value from one another; and
    switching means for selecting one of said plurality of limiting resistors to be connected to the output side of said D/A converter.

3. The data acquisition circuit according to claim 2, wherein, said switching means switches said one of said limiting resistors to be connected to said output side of said D/A converter when a given period of time lapses after a horizontal synchronizing signal is inputted.

4. The data acquisition circuit according to claim 2, wherein, said switching means receives the setting of switching timing for said limiting resistors and switches said one of said limiting resistors to be connected to said output side of said D/A converter at said switching timing after a horizontal synchronizing signal is inputted.

5. The data acquisition circuit according to claim 1, wherein, said A/D converter comprises:
    a D/A converter for updating and outputting said reference potential;
    a comparator for comparing said reference potential outputted from said D/A converter with said analog potential of said video signal and outputting a digital value corresponding to said reference potential when said reference potential coincides with said analog potential; and
    switching means for changing the resistance value of a limiting variable resistor connected to the output side of said D/A converter.

6. The data acquisition circuit according to claim 5, wherein, said switching means changes said resistance value of said limiting variable resistor connected to said output side of said D/A converter when a given period of time lapses after a horizontal synchronizing signal is inputted.

7. The data acquisition circuit according to claim 5, wherein, said switching means receives the setting of resistance-value change timing for said limiting variable resistors and changes said resistance value of said limiting variable resistor connected to said output side of said D/A converter at said resistance-value change timing after a horizontal synchronizing signal is inputted.

* * * * *